US010754100B2

(12) United States Patent
Elenbaas et al.

(10) Patent No.: US 10,754,100 B2
(45) Date of Patent: Aug. 25, 2020

(54) SEALING ENCLOSURE FOR A CONNECTOR ON A CABLE SUCH AS A STANDARDIZED FIBER-OPTIC CONNECTOR

(71) Applicant: COMMSCOPE TECHNOLOGIES LLC, Hickory, NC (US)

(72) Inventors: Jacob Arie Elenbaas, Heyningen (NL); Jarno Verhoeven, Rosemalen (NL)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 61 days.

(21) Appl. No.: 14/257,476

(22) Filed: Apr. 21, 2014

(65) Prior Publication Data

US 2014/0226937 A1    Aug. 14, 2014

Related U.S. Application Data

(63) Continuation of application No. 14/052,460, filed on Oct. 11, 2013, now Pat. No. 9,122,021, which is a
(Continued)

(30) Foreign Application Priority Data

Sep. 28, 2009  (EP) ................... 09012270

(51) Int. Cl.
   *G02B 6/38*  (2006.01)
   *G02B 6/42*  (2006.01)
   *G02B 6/44*  (2006.01)

(52) U.S. Cl.
   CPC .......... *G02B 6/3831* (2013.01); *G02B 6/387* (2013.01); *G02B 6/3847* (2013.01);
   (Continued)

(58) Field of Classification Search
   None
   See application file for complete search history.

(56) References Cited

U.S. PATENT DOCUMENTS 4,682,848 A    7/1987 Cairns et al.
4,784,459 A  * 11/1988 Jenkins ............... G02B 6/4428
                                                   385/135

(Continued)

FOREIGN PATENT DOCUMENTS

DE    35 14 010       7/1986
EP    1 775 612 A2    4/2007
(Continued)

OTHER PUBLICATIONS

European Search Report for Application No. 09012270.6 dated Feb. 11, 2010, 6 pages.

(Continued)

*Primary Examiner* — Andrew Jordan
(74) *Attorney, Agent, or Firm* — Merchant & Gould P.C.

(57) ABSTRACT

A sealing enclosure is configured to connect to a mating enclosure. The sealing enclosure loosely receives a connector within a connector volume so that the connector, which may be of a standard type used in electronic or optic data transmission, may be displaced within a plug face at the forward end of the connector volume. The connector may compensate variations in the position of a mating connector with respect to the mating enclosure. The sealing enclosure allows to seal off the connector volume and engage the sealing enclosure with a mating enclosure in a single motion. This is affected by having a cable seal interposed between an inner body and an outer body. If the outer body is moved forward to engage the mating connector, the cable seal is squeezed between the cable and the inner body sealing off the connector volume at the rearward end of the inner body.

29 Claims, 5 Drawing Sheets

Related U.S. Application Data continuation of application No. 12/924,459, filed on Sep. 28, 2010, now Pat. No. 8,556,520.

(52) U.S. Cl.
CPC .......... *G02B 6/3887* (2013.01); *G02B 6/3891* (2013.01); *G02B 6/3879* (2013.01); *G02B 6/3893* (2013.01); *G02B 6/4248* (2013.01); *G02B 6/4428* (2013.01); *Y10T 29/49174* (2015.01)

(56) References Cited

U.S. PATENT DOCUMENTS

| | | | | |
|---|---|---|---|---|
| 4,789,351 A * | 12/1988 | Fisher et al. | | 439/248 |
| 4,824,198 A * | 4/1989 | Anderton | | G02B 6/2553 385/135 |
| 4,846,714 A | 7/1989 | Welsby et al. | | |
| 5,140,207 A | 8/1992 | Baumeister et al. | | |
| 5,241,611 A * | 8/1993 | Gould | | G02B 6/2558 385/70 |
| 5,271,080 A | 12/1993 | Hopper et al. | | |
| 5,480,315 A | 1/1996 | Martinelli | | |
| 5,670,747 A | 9/1997 | Lawer et al. | | |
| 6,206,714 B1 | 3/2001 | Bernardini | | |
| 6,579,014 B2 | 6/2003 | Melton et al. | | |
| 6,648,520 B2 | 11/2003 | McDonald et al. | | |
| 6,884,113 B1 | 4/2005 | Montena | | |
| 6,962,445 B2 | 11/2005 | Zimmel et al. | | |
| 7,090,406 B2 | 8/2006 | Melton et al. | | |
| 7,090,407 B2 | 8/2006 | Melton et al. | | |
| 7,090,409 B2 | 8/2006 | Nakajima et al. | | |
| 7,113,679 B2 | 9/2006 | Melton et al. | | |
| 7,137,742 B2 | 11/2006 | Theuerkorn et al. | | |
| 7,234,877 B2 * | 6/2007 | Sedor | | 385/71 |
| 7,244,066 B2 | 7/2007 | Theuerkorn | | |
| 7,264,402 B2 | 9/2007 | Theuerkorn et al. | | |
| 7,338,214 B1 | 3/2008 | Gurreri et al. | | |
| 7,357,579 B2 | 4/2008 | Feldner | | |
| 7,549,802 B2 * | 6/2009 | Bell | | G02B 6/3849 385/53 |
| 7,572,065 B2 | 8/2009 | Lu et al. | | |
| 7,585,116 B2 * | 9/2009 | Cull | | G02B 6/383 385/139 |
| 7,600,928 B2 * | 10/2009 | Rubinstein | | G02B 6/2558 385/100 |
| 7,641,395 B2 * | 1/2010 | Ringgenberg | | G02B 6/2558 385/53 |
| 7,641,398 B2 * | 1/2010 | O'Riorden et al. | | 385/86 |
| 7,645,162 B2 | 1/2010 | Kadar-Kallen et al. | | |
| 7,744,288 B2 | 6/2010 | Lu et al. | | |
| 7,758,389 B2 | 7/2010 | Kadar-Kallen et al. | | |
| 7,785,015 B2 | 8/2010 | Melton et al. | | |
| 7,794,155 B1 | 9/2010 | Haley et al. | | |
| 7,972,067 B2 | 7/2011 | Haley et al. | | |
| 7,988,368 B2 | 8/2011 | Sakurai et al. | | |
| 8,511,907 B2 * | 8/2013 | Ringgenberg | | G02B 6/2558 385/12 |
| 8,523,454 B2 * | 9/2013 | Ringgenberg | | G02B 6/2558 385/53 |
| 8,550,721 B2 * | 10/2013 | Ringgenberg | | G02B 6/2558 385/12 |
| 8,550,722 B2 * | 10/2013 | Ringgenberg | | G02B 6/2558 385/59 |
| 8,556,520 B2 * | 10/2013 | Elenbaas et al. | | 385/55 |
| 8,628,252 B2 * | 1/2014 | Matsumoto et al. | | 385/56 |
| 8,757,276 B2 * | 6/2014 | Alff | | G02B 6/2558 385/12 |
| 8,757,891 B2 * | 6/2014 | Ringgenberg | | G02B 6/2558 374/161 |
| 9,122,021 B2 * | 9/2015 | Elenbaas | | G02B 6/3847 |
| 9,703,051 B2 * | 7/2017 | Lichoulas | | H01R 13/523 439/587 |
| 10,061,090 B2 * | 8/2018 | Coenegracht | | G02B 6/3878 |
| 10,422,962 B2 * | 9/2019 | Coenegracht | | G02B 6/3878 |
| 2003/0010519 A1 | 1/2003 | Pieck | | |
| 2003/0063867 A1 | 4/2003 | McDonald et al. | | |
| 2004/0047566 A1 | 3/2004 | McDonald et al. | | |
| 2005/0041928 A1 * | 2/2005 | Zimmel et al. | | 385/55 |
| 2005/0191910 A1 | 9/2005 | Bertini et al. | | |
| 2005/0215101 A1 * | 9/2005 | Pepe | | 439/281 |
| 2005/0281510 A1 | 12/2005 | Vo et al. | | |
| 2005/0281511 A1 * | 12/2005 | Ringgenberg | | G02B 6/2558 385/70 |
| 2006/0035509 A1 | 2/2006 | O'Connor | | |
| 2006/0089049 A1 * | 4/2006 | Sedor | | 439/620 |
| 2006/0177181 A1 * | 8/2006 | Szilagyi | | G02B 6/3885 385/71 |
| 2007/0160327 A1 | 7/2007 | Lewallen et al. | | |
| 2007/0207668 A1 * | 9/2007 | Masuzaki | | H01R 13/523 439/587 |
| 2008/0026647 A1 | 1/2008 | Boehnlein et al. | | |
| 2008/0157582 A1 | 7/2008 | Bertele | | |
| 2008/0310796 A1 * | 12/2008 | Lu | | G02B 6/3825 385/72 |
| 2009/0003793 A1 | 1/2009 | Bell et al. | | |
| 2009/0060420 A1 | 3/2009 | Cull et al. | | |
| 2009/0148102 A1 * | 6/2009 | Lu et al. | | 385/60 |
| 2009/0191750 A1 * | 7/2009 | Kadar-Kallen et al. | | 439/578 |
| 2010/0086257 A1 * | 4/2010 | Ringgenberg | | G02B 6/2558 385/59 |
| 2010/0215322 A1 * | 8/2010 | Matsumoto et al. | | 385/78 |
| 2010/0260456 A1 * | 10/2010 | Alcaraz | | G02B 6/3887 385/76 |
| 2010/0310213 A1 | 12/2010 | Lewallen et al. | | |
| 2010/0329611 A1 * | 12/2010 | Haley | | G02B 6/3879 385/58 |
| 2011/0075971 A1 * | 3/2011 | Elenbaas et al. | | 385/55 |
| 2012/0148204 A1 * | 6/2012 | Ringgenberg | | G02B 6/2558 385/96 |
| 2012/0170613 A1 * | 7/2012 | Ringgenberg | | G02B 6/2558 374/161 |
| 2012/0170614 A1 * | 7/2012 | Ringgenberg | | G02B 6/2558 374/161 |
| 2012/0170893 A1 * | 7/2012 | Ringgenberg | | G02B 6/2558 385/59 |
| 2012/0170898 A1 * | 7/2012 | Ringgenberg | | G02B 6/2558 385/96 |
| 2012/0174378 A1 * | 7/2012 | Ringgenberg | | G02B 6/2558 29/428 |
| 2014/0037253 A1 * | 2/2014 | Elenbaas et al. | | 385/87 |
| 2014/0226937 A1 * | 8/2014 | Elenbaas et al. | | 385/87 |
| 2015/0212284 A1 * | 7/2015 | Lichoulas | | G02B 6/2558 385/12 |
| 2017/0184798 A1 * | 6/2017 | Coenegracht | | G02B 6/3849 |
| 2019/0025523 A1 * | 1/2019 | Coenegracht | | G02B 6/3831 |

FOREIGN PATENT DOCUMENTS

| | | | |
|---|---|---|---|
| EP | 2 239 605 A1 | | 10/2010 |
| EP | 2302431 A1 * | | 3/2011 |
| JP | 1-134314 | | 5/1989 |
| JP | 2007-108741 | | 4/2007 |
| JP | 2007-240856 | | 9/2007 |
| JP | 2009-109578 | | 5/2009 |
| JP | 2011070191 A * | | 4/2011 |
| WO | 01/59501 | | 8/2001 |
| WO | 2008/029072 A1 | | 3/2008 |
| WO | WO 2008/157582 | | 12/2008 |

OTHER PUBLICATIONS

European Search Report for 14163884.1 dated Jun. 26, 2014.
Office Action from U.S. Appl. No. 14/052,460 dated Sep. 29, 2014.
Response to European Office Action for Application No. 09 012 270.6 dated Oct. 27, 2014.
Extended European Search Report for Application No. 17168994.6 dated Oct. 23, 2017.

\* cited by examiner

SEALING ENCLOSURE FOR A CONNECTOR ON A CABLE SUCH AS A STANDARDIZED FIBER-OPTIC CONNECTOR

CROSS REFERENCE TO RELATED APPLICATIONS

This application is a continuation of patent application Ser. No. 14/052,460, filed Oct. 11, 2013, now issued as U.S. Pat. No. 9,122,021, B2, which is a continuation of patent application Ser. No. 12/924,459, filed Sep. 28, 2010, now issued as U.S. Pat. No. 8,556,520, which claims the benefit of European Patent Application No. 09012270.6, filed Sep. 28, 2009, the disclosure of which is hereby incorporated herein by reference.

BACKGROUND

The invention relates to a sealing enclosure a connector on a cable, such as a standardized fiber-optic connector.

SUMMARY

According to the invention, one such sealing enclosure may include a cable seal adapted to sealingly engage the cable; an inner body comprising a connector volume adapted to receive the connector, the connector volume being open at least at a rearward end, and the cable seal is arranged at the rearward end of the connector volume; and an outer body adapted to slide over the inner body to a forward position, comprising at least one locking element that is adapted to axially secure the sealing enclosure to a mating enclosure if the outer body is in the forward position.

Another such sealing enclosure according to the invention may include a connector adapted to be mounted on an end of a cable, an inner body adapted to receive the cable and having a connector volume opening into a plug face at a forward end, and an outer body surrounding the inner body and being movable relative thereto.

Furthermore, the invention relates to a method for sealing a connection of a connector to an adaptor by a sealing assembly comprising a sealing enclosure and a mating enclosure, the method comprising the steps of sliding an outer body, a cable seal and an inner body of the sealing enclosure over a cable, mounting the connector on the cable, and coupling the inner body to the mating enclosure.

In the following, the direction "forward" is defined for the sealing enclosure as facing in the direction of the mating enclosure as seen from the sealing enclosure. The direction "rearward" designates the opposite direction, i.e. the direction facing away from the mating enclosure. For the mating enclosure, these directions are reversed: The "forward" direction for the mating enclosure points to the sealing enclosure and thus corresponds to the rearward direction of the sealing enclosure. Consequently, the "rearward" direction of the mating enclosure faces away from the sealing enclosure and corresponds to the forward direction of the mating enclosure.

The common forward-rearward direction of the sealing enclosure and the mating enclosure is also termed as axial direction.

From the prior art, the sealing enclosures of the type mentioned above are used as connector plugs or connector adaptors, as shown e.g. in U.S. Pat. No. 7,338,214 B1. As shown therein, the inner body may be configured as a plug body and the outer body as a shell which has a bayonet-style locking section. In the plug body and the mating enclosure, standardized connectors are fixedly mounted at a predetermined position within the enclosure.

The problem encountered with connectors of the type shown in U.S. Pat. No. 7,338,214 B1 is that they are cumbersome to be operated if not much space is available and especially if the mating connector to which the connector is to be coupled is situated on a circuit board. This is especially the case if the mating connector is part of a component such as an amplifier or transceiver.

Due to the number of parts, the connector of U.S. Pat. No. 7,338,214 B1 requires many steps for its assembly on site, often under time pressure and in limited space. This is prone to faults such as damage to the connectors or incomplete sealing.

The invention strives to solve these problems by providing a sealing enclosure that is both easy to be assembled and mounted on site and that at the same time reliably seals the connector from harsh environmental conditions.

This aim is achieved according to the invention for a sealing enclosure as mentioned above in that in the forward position, the outer body extends beyond the cable seal in the rearward direction and the cable seal is compressed by the outer body.

This solution effects that in a single motion the sealing enclosure may both be brought into engagement with the mating enclosure and the connector be sealed as the cable seal is compressed and thus tightened. In order to engage the locking element on the outer body, the operator has to move the outer body in the forward position by sliding it over the inner body. While moving the outer body into the forward position, the cable seal is automatically tightened and seals off the connector volume at a rearward end.

The above object is also solved for a sealing enclosure as mentioned above, in that the optical connector is received loosely in the forward opening and may be displaced in and/or perpendicular to the forward-rearward direction. This solution allows the connector to move freely with limited travel within the sealing enclosure. Thus, the connector may compensate variations in the position of the mating connector. The variable position of the connector within the forward opening, i.e. the plug face of the sealing enclosure, increases the freedom where the mating enclosure may be attached. This facilitates greatly the mounting of the mating enclosure in the field because close tolerances in the position of the mating connector do not need to be observed.

The sealing enclosure according to the invention is especially applicable for all types of standardized connectors in communication technology, especially for fiber-optic connectors such as LC-type connectors, or electronic connectors such as RJ-type connectors.

In comparison with the enclosure shown in U.S. Pat. No. 7,338,214 B1, the compression fitting which has to be mounted in a separate step is replaced by the cable seal which is automatically tightened in the forward position of the outer body. The connector is loosely received in the inner body and not fixed to an intermediate adaptor.

The above concept may be further improved if the following features are added. It is to be noted that the following features may be added individually and independently of each other.

In one improved further embodiment, for example, the outer body may be of a substantially hollow cylindrical shape, in which the inner body is received, which may also be of essentially cylindrical shape. Thus, an annular space is defined between the inner and the outer body if the outer body is in the forward position, which may also be of essentially cylindrical shape.

In the forward position, the outer body may, at the rearward end, extend beyond the inner body, so that the cable seal is securely held between the inner and the outer body.

According to another improvement, the sealing enclosure may further comprise a strain relief member that may be connected to the outer body. Further, the strain relief element may function as an additional seal and may sealingly abut the outer body. Alternatively, the cable seal may be sufficiently compressed in the forward position of the outer body to also work as a strain relief element or support the additional strain relief member. This is due to the compression of the cable seal, which is thereby pressed against the cable and—via friction—secures the sealing enclosure at its position on the cable via friction.

The at least one locking element serves to axially secure the sealing enclosure to the mating enclosure. The locking element may be of the bayonet-type in one preferred embodiment. The bayonet-type is advantageous, as it combines the forward motion, which leads to the sealing of the connector volume by the cable seal at the rearward end of the sealing enclosure, with a limited rotational locking motion for the axial lock. Due to the limited rotational motion, the torsion introduced into the cable seal is limited in the bayonet-style locking element. Of course, instead of the bayonet-type style, other locking elements may be used, such as a thread. A threaded connection however, may require several rotations in order to ensure a tight connection. This in turn may increase torsional strain on the cable seal compared to a bayonet coupling.

To facilitate and thus ensure the sealing of the connector volume at the rearward end, the inner body may be provided according to another preferred embodiment with a clamping section which may open in the rearward direction. Thus, the cable seal may be slid along the cable into the clamping section. The clamping section may have a retainer which is open in the rearward direction for receiving the cable seal. In the forward position of the outer body, the clamping section may be radially compressed onto the cable seal, which in turn is radially pressed onto the cable and thus seals of any gap between the cable and the cable seal. The clamping section may be radially elastic, e.g. by having radially deflectable, preferably elastic tongues which extend from the inner body along the cable in the rearward direction. The diameter spanned by these tongues is, in their neutral, non-displaced state, larger than the outer diameter of the cable seal, so that the cable seal may be received in the clamping section without using much pressure from the outer body.

The outer body may be provided at its rearward end with a closure section that may essentially comprise a wall section that faces the cable seal and is pressed against the cable seal or the clamping section if the outer body is in the forward position or is being moved into this position. In another embodiment, the outer body may not have any sealing function at all but only serves to lock the sealing enclosure with a mating enclosure. In this case, the sealing of the connector volume may be effected only by the inner body which is therefore provided with the necessary seals and sealing surfaces. However, to increase the tightness of the sealing enclosure not only the connector volume may be sealed, but also the space between the inner and the outer body.

The outer body may be provided with an engagement surface that is adapted to engage the clamping section and compress or deflect it radially around the cable seal if the outer body is in the forward position or moved into this position. The engagement surface may be a tapered or stepped cylindrical surface or wall, or a surface or wall of frusto-conical shape. At its forward end, the inner diameter of the engagement surface may be larger than the outer diameter of the clamping section. At its rearward end, the inner diameter of the engagement surface may be smaller than the outer diameter of the clamping section.

Particularly if the locking element is of the type that is rotated in order to be locked, it is preferred that the inner body is provided with at least one positive locking element that prevents a relative rotation between the inner body and the mating enclosure once the inner body and the mating enclosure are at least partly coupled. The positive locking element may be configured as a radially protruding rib extending along the cable direction away from the rearward end, or as a correspondingly formed groove or recess.

In a further improvement, the inner body may be provided at its forward end with a front seal, such as an O-ring, a circumferential and/or a forward-facing sealing surface. The front seal preferably surrounds the plug face in which the connector volume ends.

The connector volume may be of cylindrical or frusto-conical shape with the largest diameter located at the plug face. The diameter may taper towards the rearward end. At the rearward end, the diameter of the connector volume is preferably larger than the cable diameter, and at the plug face the diameter is preferably larger than the largest dimension of the connector in the radial dimension, i.e. perpendicular to the axial direction. The part of the connector volume that has a larger diameter than the connector may extend in one preferred embodiment for at least the connector length in the rearward direction from the plug face into the inner body. This allows for a loose reception of the complete connector within the connector volume, so that the connector may move at least in the direction perpendicular to the axial direction in the plug face.

The mating enclosure that is adapted to mate with the sealing enclosure in any one of its above-described configurations may comprise a preferably cylindrical guiding surface which is adapted to receive the plug section of the inner body. The inner contour of the mating enclosure may in particular correspond to the outer contour of at least the front part of the plug body, allowing for a snug fit with only small play. The guiding surface may also be provided with at least one positive locking element that is adapted to engage the at least one positive locking element of the sealing enclosure.

In order to provide adequate sealing, the mating enclosure may be provided with at least one sealing surface. One such sealing surface, preferably cylindrical in shape, may engage the circumferential surface of the inner body sealingly to affect a sealing of the radial gap between the inner body and the mating enclosure. Of course, the sealing may also take place on a forward facing surface of the inner body surrounding the plug face. In this case, the mating enclosure preferably provides a plane wall facing the plug face and a gasket may be interposed between the plug face and the mating enclosure. This sealing surface of the mating enclosure may be a part of the guiding surface.

The mating enclosure preferably comprises a central opening in which the connector and the cable are loosely received, so that in the coupled state, the position of the connector may vary both within the sealing enclosure and the mating enclosure. This may be achieved by dimensioning the central opening—like the connector volume—so that it is larger than the largest radial dimension of the connector.

Fastening elements, such as holes for the insertion of screws or clips may be provided on the mating enclosure so that it can be fixed on a component such as a circuit board or a transceiver and the like. The fastening elements may be arranged on a flange section of the mounting enclosure.

In the following, the invention is exemplarily explained with reference to An embodiment which combines the above-mentioned features. Of this combination, any feature may be omitted or added depending on whether the effect that is associated with this feature is desired or not.

BRIEF DESCRIPTION OF THE DRAWINGS

In the figures,

FIG. 6 is not drawn to scale.

DETAILED DESCRIPTION

First, the sealing enclosure according to the invention is described with reference to FIGS. 1 and 2.

Figure 1:
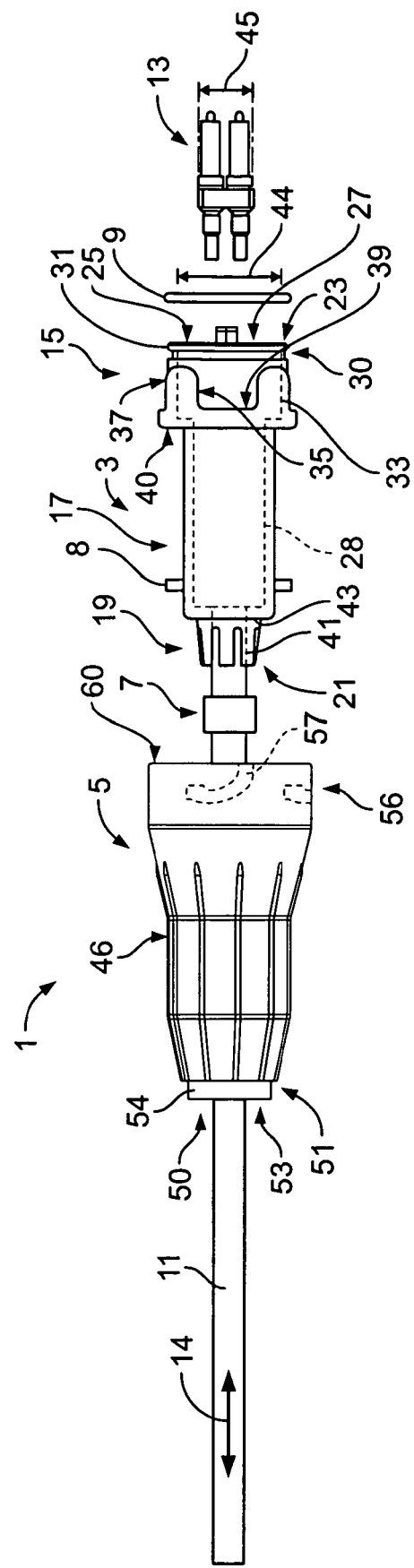
FIG. 1 shows a schematic rendition of a sealing enclosure according to the invention in an exploded side view.

In the embodiment of FIG. 1, a sealing enclosure 1 is shown that comprises an inner body 3, an outer body 5 and a cable seal 7 interposed between the inner body 3 and the outer body 5, The cable seal 7 may consist of a single elastomeric ring with preferably rectangular cross-section in the circumferential direction. In addition to the cable seal 7, the sealing enclosure 1 may comprise other members such as an e.g. annular spring element 8 and an O-ring 9, that are also arranged between the inner body 3 and the outer body 5. The spring element 8 has an outer diameter $D_1$ (see FIG. 2). The inner body 3 and the outer diameter $D_5$ at the spring element 8 (see FIG. 2). The outer body 5 has an inner diameter $D_6$ at the spring element 8 (see FIG. 2).

The outer body 5 may be moved relative to the inner body 3, preferably both slid along the inner body 3 and rotated with respect to the inner body 3. If the outer body 5 is slid over the inner body 3, there is a generally annular space 10 between the two. The annular space 10 extends parallel to a cable 11, which may be a fiber optic cable, over the entire length of the outer and inner body (see FIG. 2).

The sealing enclosure 1 is adapted to be mounted on a cable 11, such as a fiber-optic cable. The sealing enclosure 1 further is adapted to sealingly enclose a connector 13 which is mounted on an end 12 of the cable 11. The fiber optic connector 13 includes a connector body 13a and a ferrule 13b positioned at a front end 91 of the connector body 13a (see FIG. 2). The front end 91 of the connector body 13a is configured as a plug end configured to mate with a fiber optic adaptor 87 that is positioned at a mating section 62 (see FIGS. 2 and 5). The front end 91 of the connector body defines a central recess 93 having an open side 92 that faces in a forward direction (see FIG. 2). The ferrule 13b is located within the central recess 93 (see FIG. 2). A forward portion 94 of the ferrule 13b extends through the open side 92 of the central recess 93 and projects forwardly beyond the front end 91 of the connector body 13a (see FIGS. 2 and 5). The cable 11 enters the connector body 13a through a rear end 90 of the connector body 13a (see FIG. 2). The ferrule 13b has a cylindrical configuration co-axially aligned along an axis A that extends in a front-to-rear orientation, the central recess 93 being co-axially aligned along the axis A (see FIG. 2). The connector 13 may be of a standardized type used in communication technology, in particular, as shown, a dual LC-connector for the transmission of optical data signals.

The inner body 3 may be of essentially sleeve-like configuration. It represents a continuous outer wall mechanically shielding the connector volume in the radial direction, i.e. in any direction perpendicular to the cable 11. The inner body 3 may further be of generally elongated shape extending with its largest dimension along the cable 11 in an axial, forward-rearward direction 14. The inner body 3 is preferably of generally cylindrical shape and may comprise a plug section 15, a support section 17 and a clamping section 19 which all may have a generally cylindrical outer contour. The inner body 3 is adapted to be mounted on and slid along the cable 11.

The clamping section 19 is located at a rearward end 21, whereas the plug section 15 is located at a forward end 23 of the inner body 3. As a naming convention, all directions relating to the sealing enclosure and facing towards the end 12 of the cable 11 or, the mating enclosure or the connector 13, respectively, are termed the forward direction F (FIG. 2). All directions facing away from the end 12 of the cable 11, the mating enclosure or the connector 13 are termed rearward directions R (FIG. 2).

The plug section 15 encloses a forward facing plug face 25, which, in the present invention, is preferably completely open in the forward direction F and continues in the rearward direction R into the inner body 3 as a connector volume 27. The connector volume 27 constitutes the hollow interior of the inner body 3.

Figure 2:
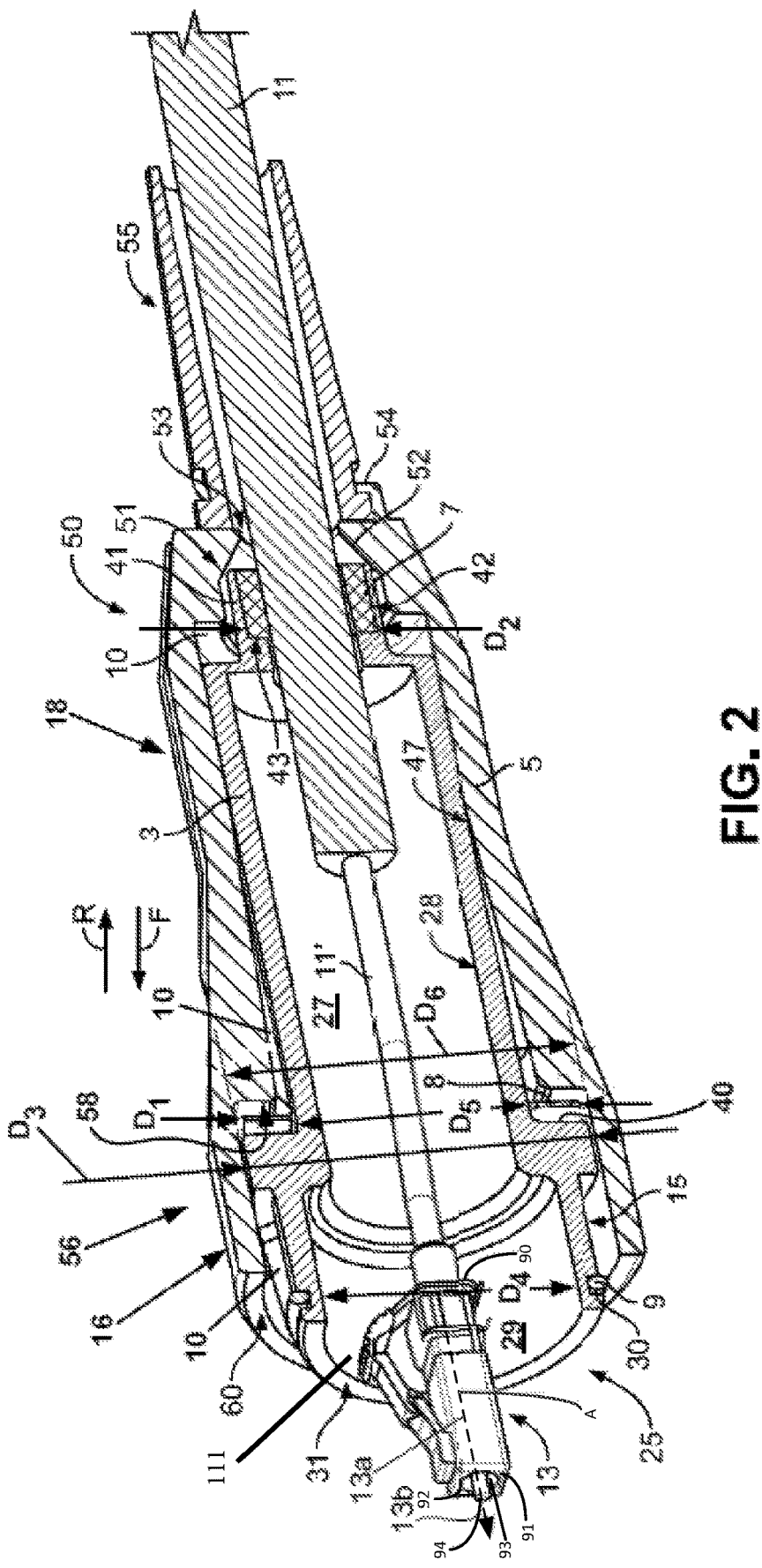
FIG. 2 shows the sealing enclosure of FIG. 1 in an assembled state in a schematic perspective and cross-sectional view.

The connector volume 27 may be of stepped cylindrical shape as shown in FIG. 2, having an inner wall 28 facing perpendicular to the forward direction. The connector volume 27 is dimensioned to loosely receive the connector 13 at least in a forward section 29, the forward section 29 forwardly terminating at the plug face 25. The forward section 29 extends over more than half, preferably over at least almost the complete axial length of the connector 13 in the axial direction. Thus, the connector 13 is received loosely, i.e. displaceable preferably both in the axial direction and in the plane of the plug face 25, in the connector volume 27. In the embodiment of FIG. 2, the forward section 29 is of a larger diameter $D_4$ (FIG. 2) than the rearward part of the connector volume 27 to provide more space for the connector 13. In the embodiment of FIG. 2, the diameter $D_4$ is equivalent to the inner width of the connector volume 27 at the plug face 25 and perpendicular to the forward direction. As depicted in FIG. 2, $D_4$ is larger than all radial widths of the connector 13 perpendicular to the forward direction such that there is an annular empty space 111 defined by the inner wall 28 and surrounding the connector 13, the annular empty space 111 being between the connector 13 and the inner wall 28 in the forward section 29 of the connector volume 27. Thus, the annular empty space 111 surrounds the connector 13 along almost the complete axial length of the connector in the axial direction, and including at the plug face 25. Alternatively, the connector volume 27 may also be of straight cylindrical, or of generally conical shape tapering in the rearward direction. As further shown in FIGS. 2 and 5, the inner wall 28 does not contact and does not encumber the connector 13 when the outer body 5 is locked with the mating section 62 and the positive locking element 33 of the plug section engages with the positive locking element 65 of the mating section 62.

The plug section 15 is provided with at least one front sealing surface 29, which in the embodiment of FIG. 1, is established by the O-ring 9. The O-ring 9 may be inserted into a circumferential groove 30 close to the forward end 23. For additional or alternative sealing, an annular front wall section 31 enclosing the plug face 25 and facing in the forward direction F may also serve as a front sealing surface if pressed e.g. against a gasket of the mating connector (not shown).

The plug section 15 may comprise at least one positive locking element 33, which has preferably two opposing stop surfaces 35, 37 pointing in opposite circumferential directions about the cable 11 and the plug face 25. The at least one positive locking element 33 may be shaped as a protrusion protruding radially from the plug section 15 and extending in the forward-rearward direction 14, or as a groove open at its forward end, recessed radially in the plug section 15 and extending in the forward-rearward direction 14.

Furthermore, the plug section 15 may have a stop surface 39 facing in the forward direction. The stop surface 39 serves as a limitation to the depth over which the inner body may be inserted into the mating enclosure. At its rearward end, a rearward facing shoulder 40 serves as another stop surface that limits the insertion depth of the inner body 3 into the outer body 5. The reward facing shoulder 40 has an outer diameter $D_3$ (see FIG.2).

As shown in FIG. 1, the plug section 15 may have an outer diameter different from, in particular larger than, the remaining sections of the inner body 3.

The support section 17 is of essentially smooth cylindrical shape. It may extend over more than half of the length of the inner body 3 along the cable 11, i.e. in the forward-rearward direction. It serves both a support and guidance surface for the outer body 5 and as a handle to facilitate installment and sliding of the inner body 3 on the cable 11. The outer diameter of the support section 17 may be larger than the outer diameter of the clamping section 19.

The clamping section 19 is configured to be deformed, particularly compressed, in the radial direction, i.e. perpendicular to the cable 11. In one embodiment, the clamping section 19 may include radially displaceable tongues 41 that may be spaced equidistantly about the perimeter of the rearward end 21 of the inner body 3, i.e. about the rearward opening in which the cable is received, and extend away from the rearward end essentially parallel to the forward-rearward direction, i.e. along the cable 11. The tongues 41 define a retainer 42 (FIG. 2) for receiving the cable seal 7 in the annular space between the tongues 41 and the cable 11. If the cable seal 7 is received in the retainer 42 at the clamping section 19, the tongues 41 are radially overlapping the outer surface of the cable seal 7 as shown in FIG. 2.

Depending on the specific way in which the cable seal 7 is inserted into the retainer 42, the inner diameter of the retainer 42 may be smaller or larger than the outer diameter $D_2$ (FIG.2) of the uncompressed cable seal 7: If the cable seal 7 and the inner body 3 are preassembled, the inner diameter of the retainer 42 is preferably smaller than the outer diameter of the cable seal 7 so that the cable seal 7 is firmly held within the retainer by being radially compressed. In addition, the retainer 42 may engage behind the cable seal to prevent its slipping out if the inner body 3 and the cable seal 7 are slid together along the cable 11 in the forward direction F. Further, the inner diameter of the cable seal 7 received in the un-deformed clamping section 19 may be larger than the outer diameter of the cable 11 to facilitate the sliding along the cable 11.

If the cable seal 7 is inserted into the retainer 42 after both the cable seal 7 and the inner body have been mounted onto the cable 11, the inner diameter of the retainer 42 may be larger than the outer diameter of the cable seal 7 so that it may be easily pushed into the retainer 42 in the field. In this embodiment, the cable seal 7 may be used to temporarily fix the inner body on the cable 11, if it is pressed onto the cable 11 when received in the retainer 42.

The clamping section 19 is provided with a rearward facing wall 43, shown in FIG. 2. The wall 43 constitutes a sealing surface, against which the cable seal 7 may be pressed. In the wall 43 there is an opening for the cable 11, the diameter of the opening being smaller than the outer diameter of the cable seal 7. This opening connects to the connector volume 27. The wall 43 delimits the retainer 42 in the rearward direction R and represents a sealing surface against which the cable seal 7 abuts if the enclosure is coupled to the mating enclosure.

The inner diameter of the inner body 3 is dimensioned so that the cable 11 or a strand 11' of the cable 11 is received loosely and the inner body 3 may be slid along the cable. The connector volume 27 including the plug face 25 has, at least at its forward section 29, an inner width 44 that is larger than the largest radial dimension 45 of the connector 13 perpendicular to the forward-rearward direction (i.e., the inner width 44 is larger than all radial widths of the connector 13 perpendicular to the forward-rearward direction). The connector 13 may thus be loosely received in the plug face 25 and the connector volume 27 at least in the region immediately behind the plug face 25.

The inner body 3 is received in the outer body 5, by sliding the latter over the former. The overall shape of outer body 5 may be the shape of a cylindrical or, as shown, frusto-conical hollow shell. The length of the outer body 5 in the forward-rearward direction 14 may be about the same as the length of the inner body 3. The rearward end 21 of the inner body 3 is covered completely by the outer body 5 if the sealing enclosure 1 is coupled or ready to be coupled to the mating enclosure. A gripping structure 46 comprising protrusions and/or recessions may facilitate the handling of the outer body 5.

The interior of the outer body 5 may comprise several sections of different diameter. The axial positions of these sections match the positions of the plug section 15, the support section 17 and the clamping section 19 in the state shown in FIG. 2, i.e. if the sealing enclosure 1 is ready to be coupled to the mating enclosure. For example, the outer body 5 includes a front section 16 that surrounds the plug section 15 and a rear section 18 that surrounds the support section 17 (see FIG.2).

The support section 17 may, in one embodiment, act as a guiding surface, with the outer body 5 having a matching, smooth inner guiding surface 47, which is of slightly larger diameter than that of the support section 17. The inner surface 47 may widen slightly, preferably conically, in the forward direction F so that the inner body 3 is received self-centeringly without the danger of becoming wedged in the outer body 5.

At its rearward end 50, the interior of the outer body 5 is provided with a closure section 51, in which the clamping section 19 is received if the sealing enclosure 1 is coupled to the mating enclosure. The closure section 51 engages behind the cable seal 7 as seen from the connector 13. It is provided with an engagement surface shaped as a tapering inner wall 52. At its forward end the closure section has an inner diameter that is larger than the outer diameter of the clamping section 19. The inner diameter of the wall 52 at the rearward end of the closure section 51 is smaller than the outer diameter of the clamping section 19 or the tongues 41, respectively. If the outer body 5 is being slid over the inner body 3, the tapering wall 52 (FIG. 2) will gradually compress the tongues 41 and the cable seal 7 received therein in the radial direction. The wail 52 ends in the rearward direction R in an opening 53 through which the cable 11 may pass.

A support element 54 of a cage-like structure, into which a strain-relief 55 may be axially inserted, may be provided at the rearward end 50 of the outer body 5. The strain relief 55 is held in the support element by a positive lock. The strain relief 55 is secured axially by the support element 54. In FIG. 1, the strain relief 55 is not shown. At the rearward end 50, an opening for passing the cable 11 therethrough is also provided.

At the forward end 56 of the outer body 5, the interior of the outer body 5 forms an enlarged section compared to the surface 47 to accommodate the enlarged plug section 15 of the inner body. At least one locking element 57, e.g. of the bayonet type, or a thread preferably may be present at the forward end 56 of the outer body, preferably on the interior side facing the plug section 15.

The outer body 5 may be provided with an annular abutment surface 58 at the rearward end of the forward part 29. The abutment surface 58 faces the shoulder 40 of the inner body in the axial direction. If the sealing enclosure is coupled to the mating enclosure, the outer body assumes its forward position, in which the spring 8 may be compressed between the shoulder 40 and the abutment surface 58 to bias the inner body 3 away from the outer body 5 and to securely lock the bayonet connection between the two.

The outer body 5 may be further provided with a front sealing surface 60 which faces in the forward direction F and surrounds the inner body 3 at its forward end. The front sealing surface 60 may be used as an additional seal besides the O-ring 9 to seal off the connector volume 27 and the space 10.

Figure 3:
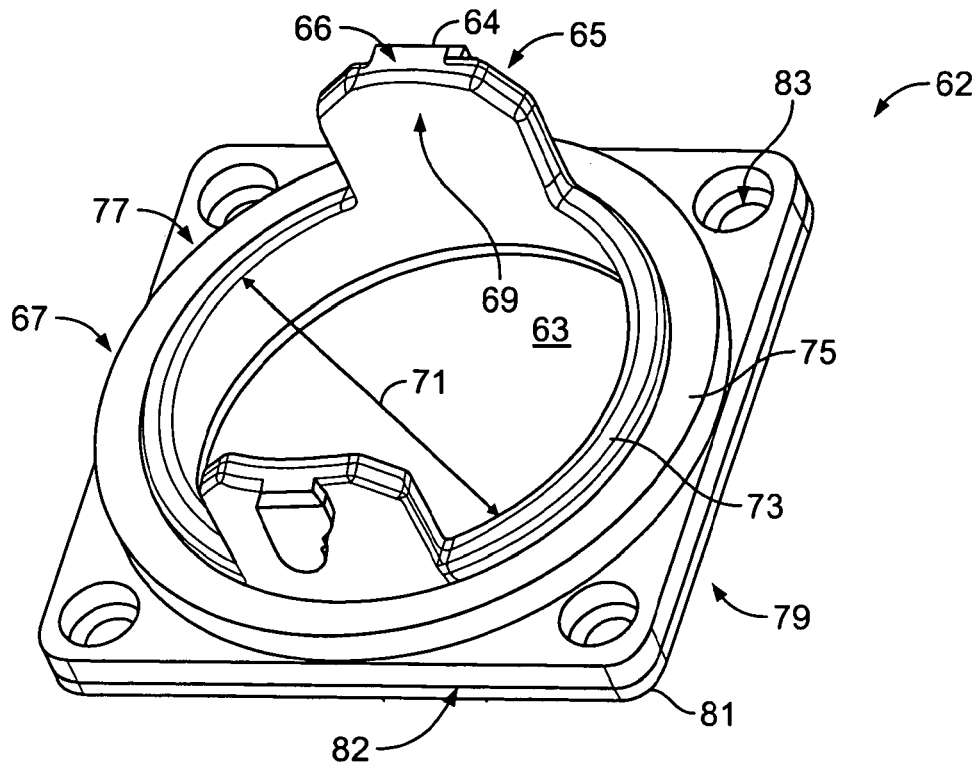
FIG. 3 shows a schematic rendition of a mating enclosure for the sealing enclosure of FIGS. 1 and 2 in a schematic perspective view.
Figure 4:
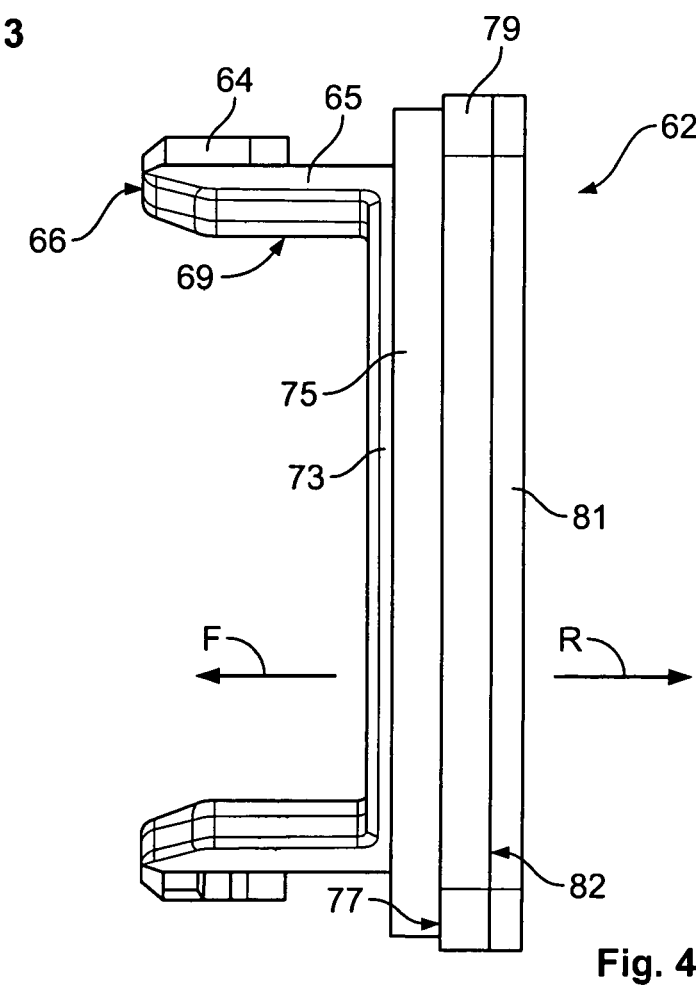
FIG. 4 shows the mating enclosure of FIG. 3 in a schematic side view.

Next, an embodiment of a mating section 62 is described exemplarily with reference to FIGS. 3 and 4.

The mating enclosure 62 has a central opening 63 of which the internal width in the radial direction is larger than the largest dimension of the connector 13 in the radial direction.

The mating enclosure 62 is further provided with at least one locking element 64 that matches the at least one locking element 57 of the outer body 5. In particular, as shown in FIG. 1, the at least one locking element 64 may comprise a protrusion 65, to enable a bayonet-type locking with the outer body 5.

As shown in FIG. 3, the locking element 64 may be positioned on two preferably inelastic tongues that protrude from a forward end of the mating enclosure 62 in the forward direction. Two or more of these locking elements may be provided if desired.

In the embodiment of FIG. 3, the protrusions 65 serve also as positive locking elements which engage between the positive locking elements 33 of the inner body 3 to prevent relative rotation between the inner body 3 and the mating enclosure 62. The forward end 67 of the protrusions 65 is designed to abut the stop surface 39 of the inner body 3.

The inner surface of the protrusions 65 is a part of a preferably continuous cylindrical inner surface 69 which continues in the forward-rearward or axial direction to enclose the central opening 63. The inner surface 69 constitutes both a guiding surface and a sealing surface for the inner body 3, in particular the sealing surface 29 or the O-ring 9, respectively, The inner diameter of the inner surface 69 is only slightly larger than the diameter at the forward end 23 of the inner body 3 to ensure a snug fit between the inner body 3 and the mating enclosure 62. The diameter 71 is, however, smaller than the outer diameter of the O-ring 9 so that the O-ring 9 is in sealing contact with the inner surface 69 if the inner body 3 is inserted into the mating enclosure 62.

The mating enclosure 62 has also a preferably annular collar 73 which is of smaller height in the axial direction than the protrusions 65. The collar 73 forms a support for a gasket 75 on its outer circumference. The gasket 75 is adapted to abut against the front sealing surface 60 of the outer body 5 once the sealing enclosure 1 and the mating enclosure 62 are fully coupled.

The forward face 77 of the mating enclosure 62 is formed by a flange 79 which is provided at its rearward face with a gasket 81. Holes 83 may be provided to receive fastening elements.

The gasket 81 is adapted to be sealingly pressed against a component such as a circuit board or an electric or optical amplifier, transceiver or the like, so that no contaminations may reach the connector volume 27 via the rearward face 82 of the mating enclosure 62. The sealing engagement between the O-ring 9 and the inner surface 69 prevents also contaminations such as dirt and moisture from entering the connector volume 27 through the plug face. The optional engagement between the sealing surface 60 and the gasket 75 seals off the space 10 between the inner body 3 and the outer body 5 and, of course, presents another barrier for dirt and moisture against entering the connector volume 27.

Thus, the connection between the connector 13 and its matching adaptor not shown) may be completely sealed off with the sealing enclosure 1 and the mating enclosure 62 in their coupled state according to the invention. The size of the connector volume 27 and the central opening 63 in the radial direction ensures that the connector 13 is received loosely. The movability of the connector 13 within the sealing enclosure 1 and the mating enclosure 62 allows compensating variations in the position of the matching adaptor within the central opening 63. Thus, the mating enclosure 62 may be placed at a position where the sealing by the gasket 81 is most effective without regard to the position of the adapter matching the connector 13.

The sealing of the connector volume 27 and preferably also of the space 10 between the inner body 3 and the outer body 5 is effected at the rearward end in a single motion during the coupling of the sealing enclosure 1 and the mating enclosure 62. This is explained in the following.

On site, an operator shortens the cable 11 to the appropriate length that is needed for the desired connection to a component e.g. an SEP transceiver on a printed circuit board having a dual LC-adaptor. Of course, any other component may be used as well.

Before or after shortening the cable 7, the operator first slides the outer body 5 onto the cable with rearward end 50 of the outer body 5 facing away from the cable end 12. After this, the operator mounts the cable seal 7 and then, the inner body 3 with the forward end 23 facing to the cable end 12.

The cable seal 7 may, however, also be pre-assembled with the inner body 3 and be mounted and slid along the cable together with the inner body. The O-ring 9 may also already be pre-assembled on the inner body 3 or may be mounted on site. Finally, the operator mounts the connector 13 onto the end of the cable 11. Now, the sealing enclosure 1 is mounted in the configuration shown in FIG. 1.

If, starting from the position shown in FIG. 1, the sealing enclosure 1 is to be coupled to a mating enclosure 62 (FIG. 3), first, the connector 13 is mated to a corresponding adaptor (not shown). Then, the inner body 3 is slid forward on the cable 11 until engagement with the mating enclosure 62. The stop surface 39 prevents that the inner body 3 is inserted too deeply into the mating enclosure. In the shown embodiment, this engagement leads also to a positive lock between the inner body 3 and the mating enclosure 62. The positive lock prevents rotation of the inner body 3 with respect to the mating enclosure 62.

Next, the outer body 5 is slid forward on the cable 11 over the inner body 3 into its forward position in order to bring the locking element 57 of the outer body 5 into engagement with a matching locking element on the mating enclosure 62.

If the cable seal is not yet received in the retainer 42, the outer body 5 in one embodiment may automatically push the cable seal 7 along the cable 11 in the forward direction F into the retainer 42.

Preferably, the outer body 5 is guided in the forward-rearward direction, i.e. along the cable 11, by the support section 17 to further facilitate the coupling process. Near the end of the forward motion of the outer body 5, the clamping section 19 is compressed around the cable seal 7 by the tapering wall 52. The radial compression leads to a tight fit of the cable seal 7 on the cable 11 and to a lengthening of the cable seal 7 in the axial direction so that the cable seal 7 presses against wall 43. Thus the rearward end of the connector volume is sealed off. If the axial length of the cable seal is chosen so that it projects in the rearward direction from the clamping section, the space 10 may also be sealed by the tapering wall 52 pressing directly against cable seal 7.

During the forward motion, the locking elements of the outer body are brought into engagement with the locking elements of the mating enclosure 62. At the end of the forward motion of the outer body 5 relative to the inner body 3 and the mating enclosure 62, the outer body is rotated with respect to the inner body 3 which is locked non-rotationally to the mating enclosure 62 due to the locking elements 35, 37, 65. This leads to a full engagement of the locking elements and a completion of the connection. At the same time the spring element 8 is compressed axially between the outer and the inner bodies 3, 5. The compression of the spring element 8 may be released somewhat at the end of the rotation by allowing the outer body 5 to move away from the mating enclosure 62 at the end of the rotation and snap into a recess. Thus, the outer body 5 and the mating enclosure 62 are locked non-rotationally at this position. Release of the locking engagement may only be affected after the outer body 5 is moved towards the mating enclosure 62 against the action of the spring 8.

At the forward position, the O-ring 9 is in sealing engagement with the inner surface 69, and the front surface 60 is pressed into the gasket 75.

Figure 5:
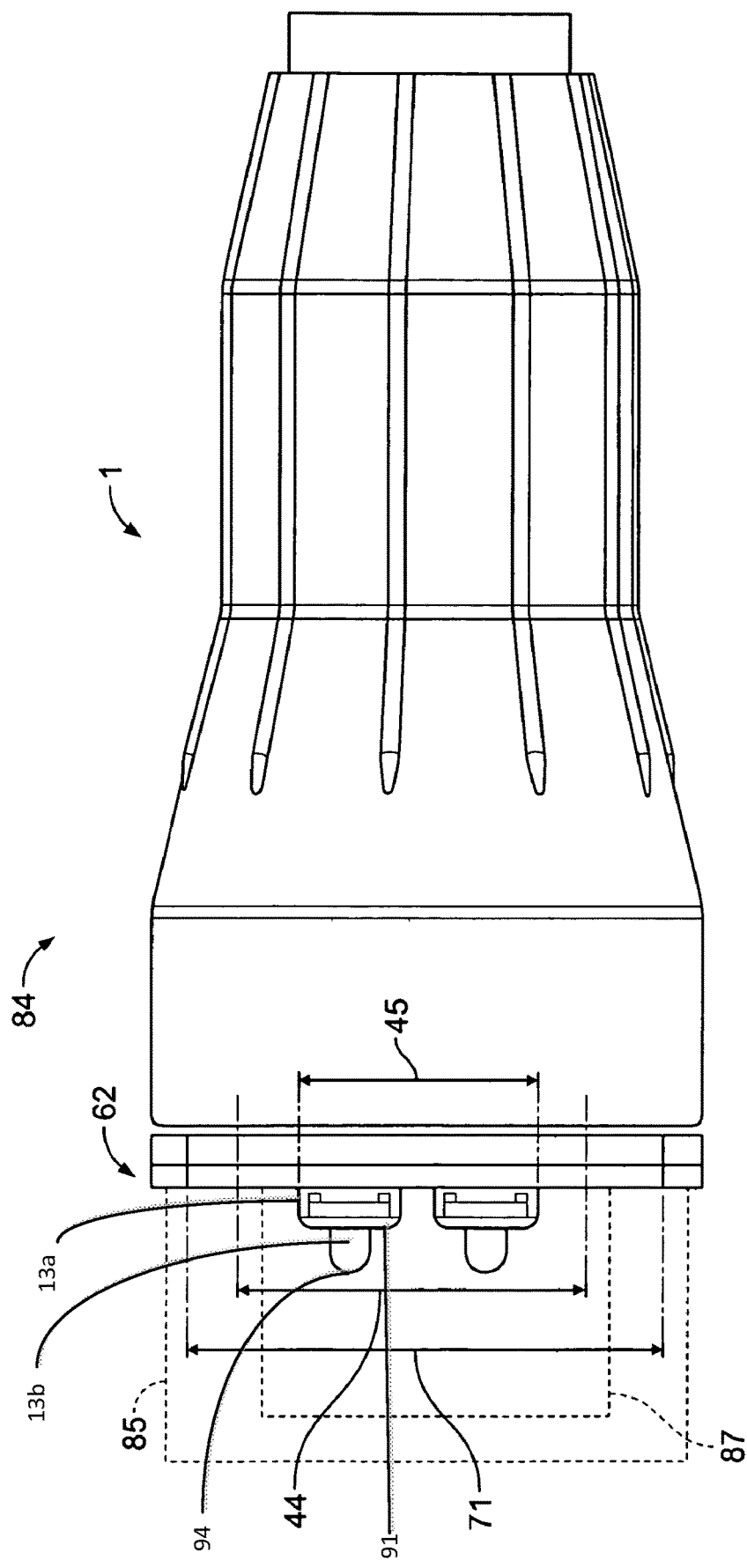
FIG. 5 shows the sealing assembly comprising the sealing enclosure of FIG. 1, 2 and the mating enclosure of FIG. 3, 4 in the plug state in a schematic side view.
Figure 6:
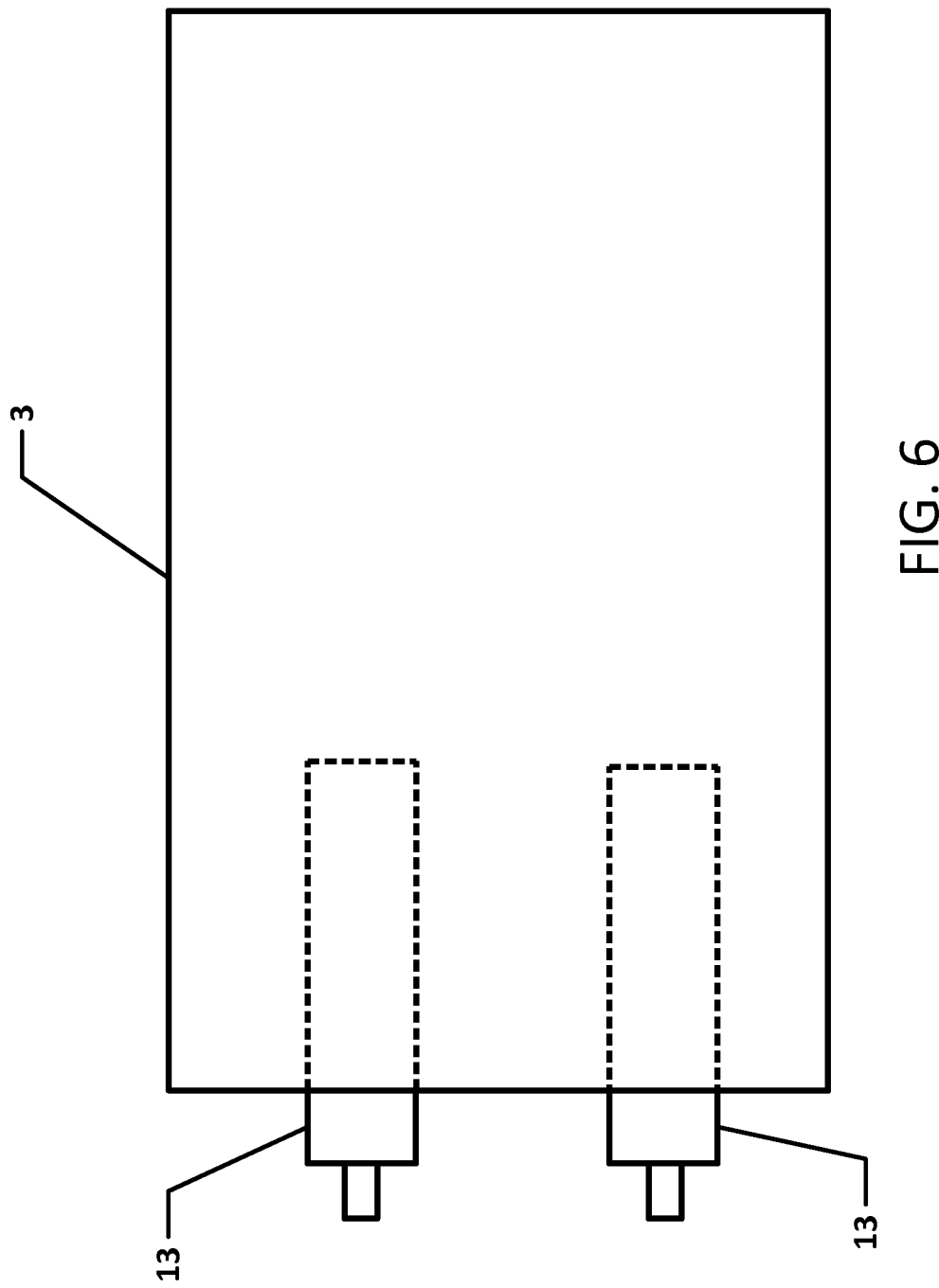
FIG. 6 is a schematic block diagram of an inner body of a sealing closure extending over at least almost a complete axial length of a fiber optic connector in an axial direction.

FIG. 5 shows a sealing assembly 84 comprising sealing enclosure 1 and the mating enclosure 62 in the coupled state, i.e. the outer body 5 in the forward position, without strain relief. The mating enclosure 62 is mounted on a component 85 that is shown schematically using phantom lines. As can be seen, the inner widths 44, 71 of the connector volume 27 and of the central opening 63 are larger than the largest radial dimension 45 of the connector 13 so that the connector may be moved within the mounted sealing enclosure 1 and mating enclosure 62 to adapt to the actual position of an adaptor 87 within the mating enclosure 62. The overall configuration of the sealing enclosure 1 allows for an easy single-handed mounting operation. The sealing and the locking of the sealing enclosure 1 and the mating enclosure 62 is affected in a single motion.

What is claimed is:

1. A sealing enclosure comprising:
   a fiber optic connector mounted on an end of a cable, the fiber optic connector including a connector body having a front end, at which a ferrule is supported;
   an inner body extending from a forward end of the inner body to a rearward end of the inner body along an axial direction of the enclosure, the inner body having a connector volume defined by an inner wall facing perpendicular to a forward direction, the fiber optic connector being received within the connector volume, the forward end of the inner body including a plug section having a forward facing plug face that is open in the forward direction, the plug section including at least one positive locking element;
   an outer body extending from a forward end of the outer body to a rearward end of the outer body along the axial direction of the sealing enclosure, the outer body surrounding the inner body and being movable relative thereto, the outer body having a locking element of the bayonet type at the forward end of the outer body, the locking element provided on an interior side of the outer body facing the plug section;
   a mating section provided with at least one locking element that matches the at least one locking element of the outer body to enable a bayonet-type locking with the outer body, the mating section also including a positive locking element that engages with the positive locking element of the plug section to prevent relative rotation between the inner body and the mating section, the mating section including an annular collar forming support for a gasket on its outer circumference, wherein a sealing surface of the outer body abuts against the gasket when the outer body is locked with the mating section; and
   a spring element;
   wherein the inner wall of the connector volume does not contact the connector when the outer body is locked with the mating section and the positive locking element of the plug section engages with the positive locking element of the mating section;
   wherein the inner body extends over at least almost the complete axial length of the fiber optic connector body in the axial direction;
   wherein when the outer body is locked with the mating section and the positive locking element of the plug section engages with the positive locking element of the mating section, the rearward end of the outer body is positioned rearwards of the rearward end of the inner body along the axial direction;
   wherein the inner body includes a rearwardly facing shoulder, and wherein the outer body includes an abutment surface that faces the shoulder in the axial direction;
   wherein the spring element is positioned between the rearwardly facing shoulder and the abutment surface, the spring providing a spring action between the rearwardly facing shoulder and the abutment surface; and wherein release of a locking engagement between the outer body and the mating section may only be affected after the outer body is moved forward and toward the mating section against the spring action.

2. The sealing enclosure of claim 1, wherein the positive locking element is shaped as a protrusion.

3. The sealing enclosure of claim 1, wherein the positive locking element is shaped as a groove open at its forward end.

4. The sealing enclosure of claim 1, wherein the mating section includes two or more of the locking elements and the outer body includes two or more of the locking elements.

5. The sealing enclosure of claim 1, wherein the abutment surface is annular.

6. The sealing enclosure of claim 1, wherein the inner body is received in the outer body by sliding the latter over the former.

7. The sealing enclosure of claim 6, wherein the inner body includes a support section that extends in the forward-rearward direction, and wherein the outer body has an inner guiding surface that slides along the support section when the inner body is received in the outer body.

8. The sealing enclosure of claim 1, wherein the forward end of the inner body includes a front sealing surface.

9. The sealing enclosure of claim 1, further comprising a radially compressed seal interposed between the inner body and the outer body.

10. The sealing enclosure of claim 9, wherein the front sealing surface is established by an O-ring inserted into a circumferential groove or an annular front wall section if pressed against a gasket of the mating section.

11. The sealing enclosure of claim 9, wherein the seal is received in a cable retainer of the inner body.

12. The sealing enclosure of claim 1, further comprising a radially compressed seal adjacent the rearward end of the outer body.

13. The sealing enclosure of claim 1, further comprising an annular seal positioned rearward of the spring element for sealing between the inner body and the outer body.

14. The sealing enclosure of claim 13, wherein the spring element has an outer diameter that is larger than an outer diameter of the annular seal.

15. The sealing enclosure of claim 1, wherein the spring element is positioned radially between the outer body and the inner body, and wherein the outer body defines an inner diameter at the spring element that is larger than an outer diameter of the rearwardly facing shoulder of the inner body.

16. The sealing enclosure of claim 15, wherein the plug section defines an inner diameter at the fiber optic connector that is larger than an outer diameter of the inner body at the spring element.

17. The sealing enclosure of claim 1, wherein the inner body includes an elongate rear support section that extends rearwardly from the plug section, wherein the outer body includes a front section that surrounds the plug section of the inner body and a rear section that surrounds the rear support section of the inner body, the front section of the outer body extending from a front end of the outer body to an interior radial in-step of the outer body, the rear section of the outer body extending from the interior radial in-step of the outer body to a rear end of the outer body, and the rear section of the outer body being longer than the front section of the outer body in the axial direction.

18. The sealing enclosure of claim 1, wherein the connector volume has a cylindrical shape within the plug section.

19. The sealing enclosure of claim 1, wherein the connector volume has a stepped cylindrical shape with a forward section having an enlarged diameter and a rearward section with a reduced diameter.

20. The sealing enclosure of claim 1, further comprising a fiber optic adaptor positioned at the mating section, wherein the front end of the connector body is configured as a plug end configured to mate with the fiber optic adaptor, wherein the front end of the connector body defines a central recess having an open side that faces in a forward direction, wherein the ferrule is located within the central recess, wherein a forward portion of the ferrule extends through the open side of the central recess and projects forwardly beyond the front end of the connector body.

21. The sealing enclosure of claim 20, wherein the ferrule has a cylindrical configuration co-axially aligned along an axis that extends in a front-to-rear orientation, and wherein the central recess is enlarged relative to the ferrule such that a spacing exists between an outer cylindrical surface of the ferrule and an inner wall surface of the connector body defining the central recess.

22. The sealing enclosure of claim 1, wherein the outer body is rotatable relative to the inner body.

23. The sealing enclosure of claim 22, wherein rotating the outer body relative to the inner body causes the sealing surface of the outer body to abut the gasket.

24. The sealing enclosure of claim 1, wherein the inner body is slidable along the cable.

25. The sealing enclosure of claim 1, wherein when the outer body is locked with the mating section and the positive locking element of the plug section engages with the positive locking element of the mating section there is an annular empty space defined by the inner wall of the connector volume that surrounds the connector at the forward facing plug face.

26. A sealing enclosure comprising:
   a fiber optic connector mounted on an end of a cable, the fiber optic connector including a connector body having a front end, at which a ferrule is supported;
   an inner body extending from a forward end of the inner body to a rearward end of the inner body along an axial direction of the enclosure, the inner body having a connector volume defined by an inner wall, the fiber optic connector being received within the connector volume, the forward end of the inner body including a plug section having a forward facing plug face that is open in a forward direction, the plug section including at least one positive locking element;
   an outer body extending from a forward end of the outer body to a rearward end of the outer body along the axial direction of the enclosure, the outer body surrounding the inner body and being movable relative thereto, the outer body having a locking element of the bayonet type at the forward end of the outer body, the locking element provided on an interior side of the outer body facing the plug section; and
   a mating section provided with at least one locking element that matches the at least one locking element of the outer body to enable a bayonet-type locking with the outer body, the mating section also including a positive locking element that engages with the positive locking element of the plug section to prevent relative rotation between the inner body and the mating section, the mating section including an annular collar forming support for a gasket on its outer circumference, wherein a sealing surface of the outer body abuts against the gasket when the outer body is locked with the mating section;

wherein when the outer body is locked with the mating section and the positive locking element of the plug section engages with the positive locking element of the mating section there is an annular empty space defined by the inner wall of the connector volume that surrounds the connector at the forward facing plug face;

wherein when the outer body is locked with the mating section and the positive locking element of the plug section engages with the positive locking element of the mating section, the rearward end of the outer body is positioned rearwards of the rearward end of the inner body along the axial direction;

wherein the inner body includes a rearwardly facing shoulder, and wherein the outer body includes an abutment surface that faces the shoulder in the axial direction;

wherein the spring element is positioned between the rearwardly facing shoulder and the abutment surface, the spring providing a spring action between the rearwardly facing shoulder and the abutment surface; and wherein release of a locking engagement between the outer body and the mating section may only be affected after the outer body is moved forward and toward the mating section against the spring action.

27. The sealing enclosure of claim 26, wherein the inner body extends over at least almost the complete axial length of the fiber optic connector body in an axial direction.

28. A sealing enclosure comprising:

a fiber optic connector mounted on an end of a cable, the fiber optic connector including a connector body having a front end, at which a ferrule is supported;

an inner body extending from a forward end of the inner body to a rearward end of the inner body along an axial direction of the enclosure, the inner body having a connector volume defined by an inner wall, the fiber optic connector being received within the connector volume, the inner body having a forward end including a plug section having a forward facing plug face that is open in a forward direction, the plug section including at least one positive locking element;

an outer body extending from a forward end of the outer body to a rearward end of the outer body along an axial direction of the enclosure, the outer body surrounding the inner body and being movable relative thereto, the outer body having a locking element of the bayonet type at the forward end of the outer body, the locking element provided on an interior side of the outer body facing the plug section; and a mating section provided with at least one locking element that matches the at least one locking element of the outer body to enable a bayonet-type locking with the outer body, the mating section also including a positive locking element that engages with the positive locking element of the plug section to prevent relative rotation between the inner body and the mating section, the mating section including an annular collar forming support for a gasket on its outer circumference, wherein a sealing surface of the outer body abuts against the gasket when the outer body is locked with the mating section;

wherein the inner body extends over at least almost the complete axial length of the connector in an axial direction such that an annular empty space defined by the inner wall of the connector volume surrounds the connector along almost the complete axial length of the connector in the axial direction;

wherein when the outer body is locked with the mating section and the positive locking element of the plug section engages with the positive locking element of the mating section, the rearward end of the outer body is positioned rearwards of the rearward end of the inner body along the axial direction;

wherein the inner body includes a rearwardly facing shoulder, and wherein the outer body includes an abutment surface that faces the shoulder in the axial direction;

wherein the spring element is positioned between the rearwardly facing shoulder and the abutment surface, the spring providing a spring action between the rearwardly facing shoulder and the abutment surface; and wherein release of a locking engagement between the outer body and the mating section may only be affected after the outer body is moved forward and toward the mating section against the spring action.

29. The sealing enclosure of claim 28, wherein the annular empty space surrounds the connector at the forward facing plug face.

* * * * *